United States Patent [19]

Hesler

[11] 4,378,199

[45] Mar. 29, 1983

[54] VARIABLE SPEED DRIVE

[75] Inventor: Benjamin F. Hesler, Canastota, N.Y.

[73] Assignee: Carrier Corporation, Syracuse, N.Y.

[21] Appl. No.: 322,357

[22] Filed: Nov. 18, 1981

[51] Int. Cl.³ .............................................. F04B 49/00
[52] U.S. Cl. ...................................... 417/15; 236/84; 474/26
[58] Field of Search ....................... 474/26; 236/10, 84; 417/14, 15; 415/47

[56] References Cited

U.S. PATENT DOCUMENTS

| 2,158,250 | 5/1939 | Peters | 236/10 |
| 2,289,287 | 7/1942 | Hallinan | 236/10 |
| 2,308,507 | 1/1943 | Hallinan | 474/26 X |
| 2,308,655 | 1/1943 | Hallinan | 236/10 X |
| 2,479,069 | 8/1949 | Hallinan | 236/10 X |
| 2,512,425 | 6/1950 | Hallinan | 236/10 X |
| 2,838,243 | 6/1958 | Peters | 236/10 |
| 3,678,773 | 7/1972 | Rohrbach et al. | 474/26 |
| 4,345,878 | 8/1982 | Griffin | 417/15 |

Primary Examiner—William E. Tapolcai
Attorney, Agent, or Firm—Donald F. Daley; David J. Zobkiw

[57] ABSTRACT

The fan motor of a variable speed drive for a fan is positioned in response to thermostatic demand and a feedback signal responsive to the position of the variable speed drive. Changing thermostatic demand causes movement of the fan motor until an equilibrium position is reached again.

4 Claims, 2 Drawing Figures

VARIABLE SPEED DRIVE

BACKGROUND OF THE INVENTION

Bleed-type thermostats regulate air pressure by bleeding control air to atmosphere at a varying rate in accordance with system demands. In variable speed fan drives, a fan motor having a variable sheave is moved with respect to the fan pulley which results in a different radius of contact between the belt and the sheave faces. As a result, fan output is related to fan motor position. The use of a bleed thermostat to supply control pressure for causing the movement of the fan motor, by itself, lacks a feedback to position the fan motor at an intermediate position in accordance with system demand.

In one type of pressure regulator a diaphragm divides the housing and is acted on by spring force and fluid pressure. Generally, a valve member is connected to the diaphragm and tends to be biased closed by fluid pressure acting on one side of the diaphragm. An opening bias is provided by a compression spring acting on the other side of the diaphragm with a force that is adjustable through a screw adjustment. Although such a pressure regulator is adjustable it must be manually adjusted. It is not automatically adjusted in response to system conditions.

SUMMARY OF THE INVENTION

A differential pressure switch arrangement is used to actuate a gear motor to position a fan motor in response to thermostatic demand. The pressure signal supplied by the bleed thermostat is balanced against a pressure signal indicative of fan motor position. This is achieved by making a pressure regulator supplying the second or balance signal position responsive. The present invention supplements the screw adjustment for regulating the compression spring with a tension spring bias which varies with the position of the fan motor. More specifically, a tension spring acts through a lever to provide a variable force opposing the compression spring of a pressure regulator so as to change the pressure of the air supplied by the pressure regulator. The tension on the tension spring is varied in response to the position of the base of the fan motor to which the tension spring is attached.

It is an object of this invention to provide a pneumatic pressure regulator which produces an output air signal analogous to spring tension.

It is a further object of this invention to provide an output pressure which is changed proportionally to the change in the position of a movable member.

It is another object of this invention to position a variable speed fan drive in response to both a thermostatically controlled and a positionally controlled pressure.

It is an additional object of this invention to provide an adjustable variable bias pressure regulator for providing a pressure output responsive to the position of a movable member. These objects, and others as will become apparent hereinafter, are accomplished by the present invention.

Basically, the compression spring of a pressure regulator acts against a lever in opposition to a tension spring whose spring force varies with the position of the fan motor of a variable speed drive. The fan motor is in turn positioned in response to thermostatic demand so that the setting of the pressure regulator is thereby system condition responsive.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
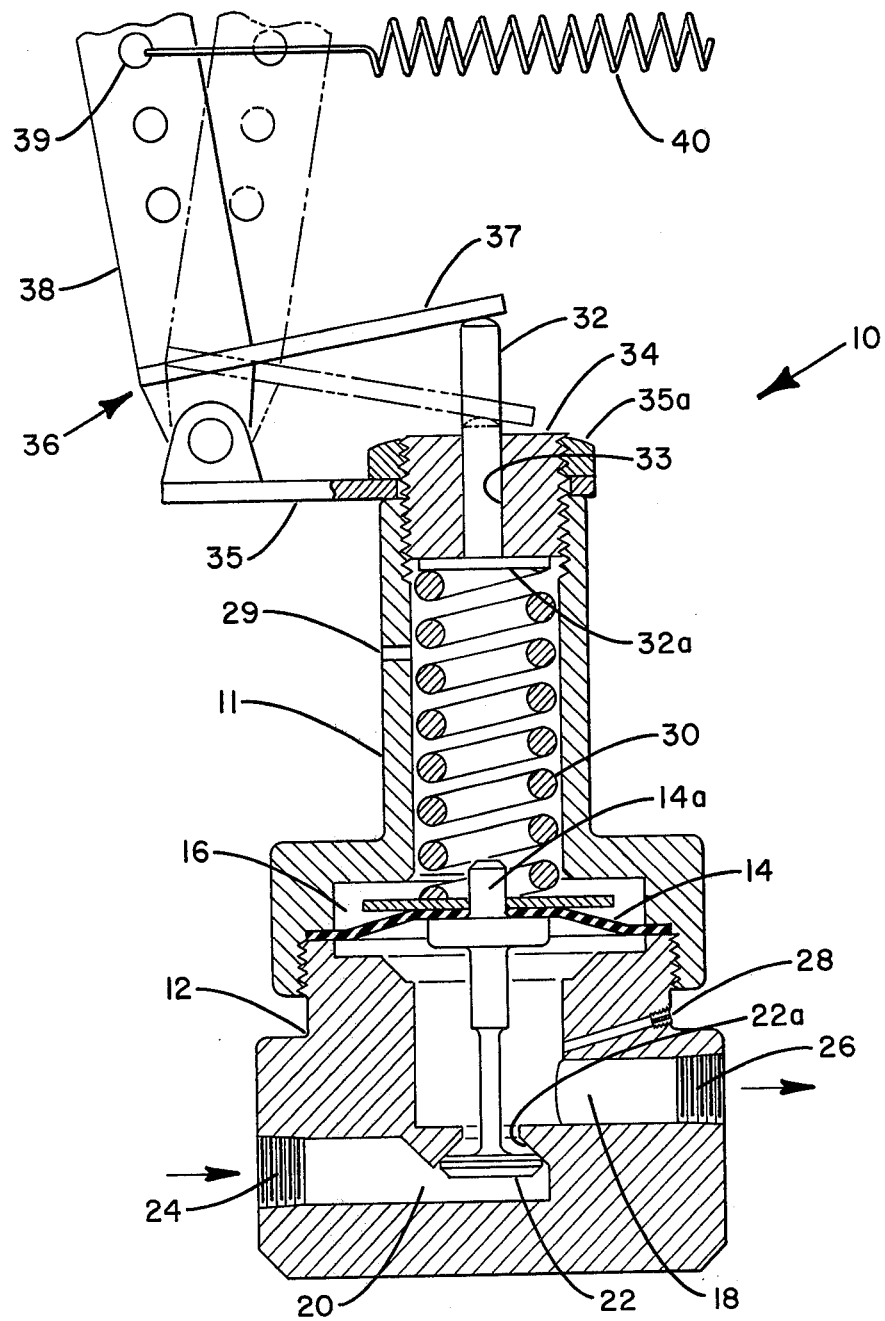
FIG. 1 is a sectional view of a pressure regulator.

In FIG. 1, the numeral 10 generally designates a pressure regulator having an upper housing portion 11 and a lower housing portion 12. Diaphragm 14 is sealingly received between the upper housing portion 11 and lower housing portion 12 and defines therewith spring chamber 16 and outlet chamber 18, respectively. Lower housing portion 12 contains inlet chamber 20 which is in fluid communication with outlet chamber 18 under the control of valve 22 which is secured to diaphragm 14 and moves therewith. Inlet chamber 20 is connected to a source of pressure via inlet port 24. Outlet chamber 18 is connected to a point of use via outlet port 26 and is provided with an atmospheric bleed in the form of an apertured plug 28. Spring chamber 16 is vented to the atmosphere via vent 29 and houses spring 30 which has one end received on spring retainer 14a of diaphragm 14 and the other end engages head 32a of spring plunger 32. Spring plunger 32 is slidably received in opening 33 of threaded member 34 which is adjustably received in upper housing portion 11. Lever 36 is pivotably mounted on base 35 which is secured to upper housing 11 by nut 35a. Lever 36 is preferably pivoted at the intersection of the arms 37 and 38 which form a right angle. Arm 37 normally engages spring plunger 32. Arm 38 is provided with a plurality of holes 39 so that the effective lever arm of arm 38 can be varied. Tension spring 40 is selectively secured to one of the holes 39 depending upon the desired effective lever arm.

Assuming that spring 40 is not secured at both ends and that all of the chambers of the pressure regulator 10 are at atmospheric pressure, compression spring 30 will force the spring plunger 32 upwardly until head 32a engages the threaded member 34 to prevent further movement. Additionally, spring 30 acts on diaphragm 14 pushing it downwardly unseating valve 22 from valve seat 22a. The only force opposing spring 30 will be the return force of the diaphragm 14. When pressurized air is supplied at inlet port 24 it will pass into inlet chamber 20, through open valve 22 into outlet chamber 18 from which it will pass via outlet port 26 to the point of use. As pressure builds up in chamber 18 it acts on diaphragm 14 in opposition to spring 30 thereby tending to close valve 22. When the pressure builds up sufficiently in chamber 18 valve 22 will be seated. However, since apertured plug 28 provides an atmospheric bleed, the pressure in chamber 18 will gradually reduce so that spring 30 is again able to unseat valve 22 to thereby permit the pressure source to communicate with chamber 18. The pressure at which valve 22 unseats will be determined by the position of threaded member 34 which adjusts the bias of spring 30. Generally speaking, this is a conventional mode of operation for a pressure regulator. However, when a variable force is supplied to arm 38 of lever 36 through spring 40, valve 22 becomes responsive to the force of spring 40 since this causes lever arm 37 to act against spring plunger 32 to tend to cause the flange 32a to separate from threaded member 34. Any such separation of head 32a and threaded member 34 tends to compress the spring 30 and thereby require a higher pressure in chamber 18 to achieve the seating of valve 22 and so a higher pressure is delivered via outlet port 26 to the point of use.

Figure 2:
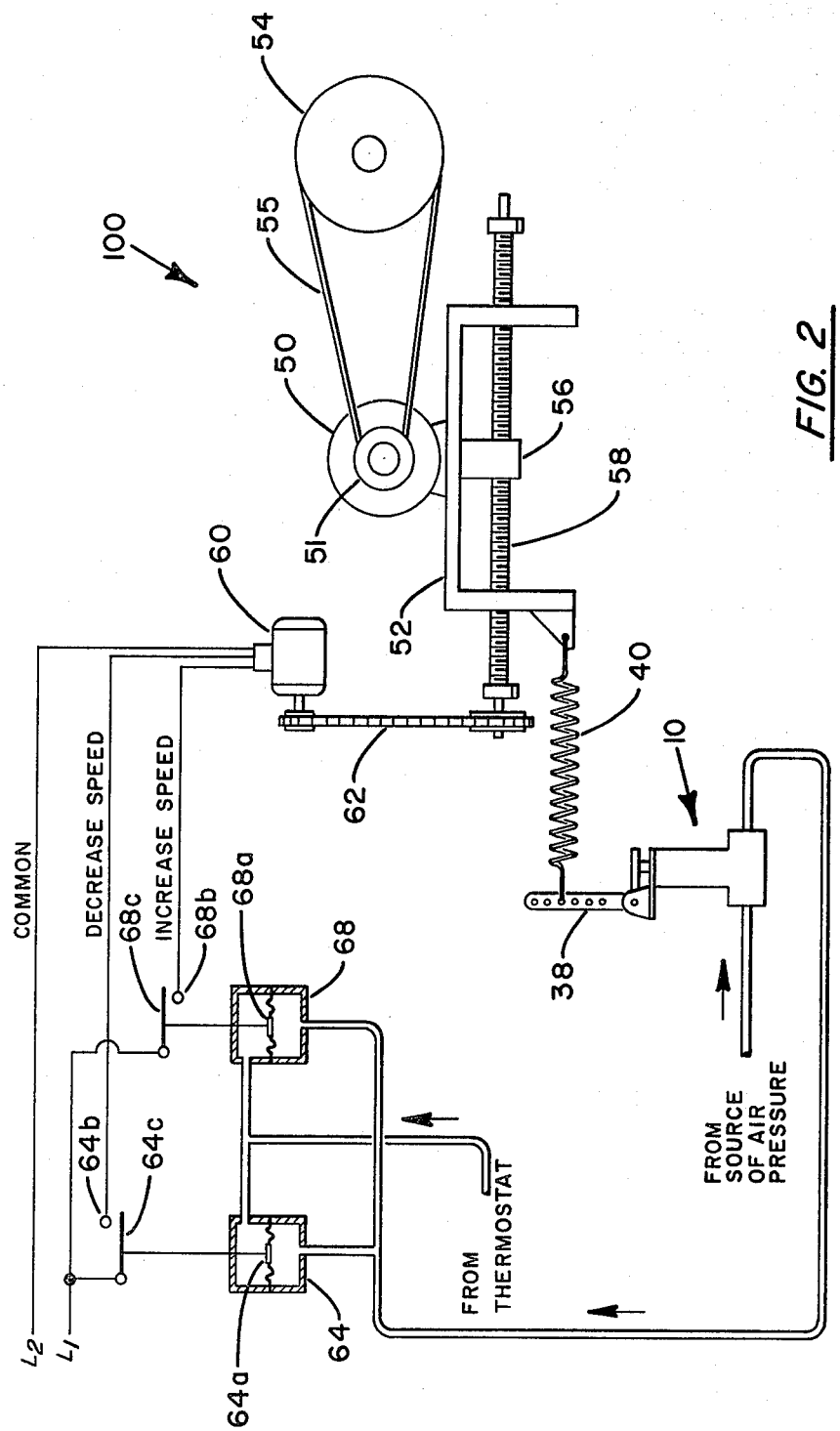
FIG. 2 is a schematic representation of a thermostatically responsive variable speed drive.

Referring now to FIG. 2, wherein the numeral 100 generally designates a thermostatically responsive variable speed fan drive for the fan of an air circulating system. Variable sheave fan motor 50 is mounted on movable table 52 and is drivably connected to the fan pulley 54 through belt 55. Movable table 52 has a nut 56 secured thereto which coacts with the drive screw 58 to cause table 52 to move to thereby change the speed of the fan due to the variable sheave 51 of motor 50. The change of speed is due to the belt 55 having a radius of engagement with the faces of sheave 51 which is dependent upon the distance between motor 50 and pulley 54. Drive screw 58 is connected to gear motor 60 through chain 62. Pressure regulator 10 is connected to table 52 via tension spring 40. A source of 20 psig air is connected to regulator 10 which delivers a 3 to 15 psig signal to one side of the diaphragms 64a and 68a, respectively, of differential pressure switches 64 and 68. A bleed type thermostat (not illustrated) delivers a 3 to 15 psig demand related air signal to the other side of the diaphragms 64a and 68a, respectively, of differential pressure switches 64 and 68.

With the system in balance, the pressure signals supplied by the thermostat and pressure regulator 10 across differential pressure switches 64 and 68 will be equal. Differential pressure switches 64 and 68 will be open and the pressure in outlet chamber 18 will be maintained within limits by the coaction of air bleeding through apertured plug 28 and the unseating of valve 22 to bring chamber 18, and thereby the pressure on one side of diaphragms 64a and 68a, back to pressure. This pressure variation is not sufficient to move diaphragms 64a and 68a enough to close the contacts of switches 64 or 68. Rising pressure from the bleed thermostat raises the pressure signal supplied to one side of the diaphragms 64a and 68a which thereby move and close the contacts 68b and c of differential pressure switch 68. The closing of contacts 68b and c causes gear motor 60 to drive the drive screw 58, via chain 62, so as to move motor table 52 in a direction to produce increasing fan speed, i.e. toward fan pulley 54. As motor table 52 moves toward fan pulley 54, tension spring 40 is stretched causing lever 36 to pivot such that spring plunger 32 is forced downward thereby changing the bias of spring 30 and the equilibrium pressure of chamber 18. As a result, the pressure in chamber 18 is caused to rise until the pressure is again balanced across diaphragms 64a and 68a, opening contacts 68b and c of switch 68. Pressure regulator 10 thereby provides a regulated pressure related to the position of table 52. Further rises in the pressure from the thermostat will produce the same response.

If, however, the pressure supplied by the bleed thermostat to the differential pressure switches 64 and 68 is reduced, the dropping pressure unbalances the pressures across diaphragms 64a and 68a which are moved thereby causing the closing of contacts 64b and c of differential pressure switch 64 thereby causing gear motor 60 to drive the drive screw 58, via chain 62, so as to move motor table 52 in a direction to produce decreasing fan speed, i.e. from fan pulley 54. As motor table 52 moves from fan pulley 54, tension spring 40 is retracted permitting spring 30 to force spring plunger 32 upwardly thereby changing the bias of spring 30 and the equilibrium pressure of chamber 18. As a result, the pressure in chamber 18 is caused to fall until the pressure is again balanced across diaphragms 64a and 68a, opening contacts 64b and c of switch 64. Pressure regulator 10 thereby again provides a regulated pressure related to the position of table 52.

Although a preferred embodiment of the present invention has been illustrated and described, other changes will occur to those skilled in the art. For example, bleed 28 can be made through diaphragm 14. Also, spring plunger 32 can be replaced by or actuated through a cam. The pair of differential switches can be replaced with a single diaphragm actuated double pole switch and/or reversed as to which direction the base is moved in response to changing thermostatically supplied pressure. It is therefore intended that the scope of the present invention is to be limited only by the scope of the appended claims.

What is claimed is:

1. A thermostatically responsive variable speed drive comprising:
   variable sheave fan motor means mounted on a movable base for driving a fan at a variable speed dependent upon the position of said movable base;
   means for reciprocably moving said movable base;
   normally open, differential pressure switch means for activating said means for reciprocably moving said movable base to respectively increase and decrease the driving speed of said fan motor means;
   means for supplying a first pressure signal to one side of said differential pressure switch means responsive to thermostatic demand;
   means for supplying a second pressure signal to an opposite side of said differential pressure switch means responsive to the position of said movable base;
   whereby when said first and second pressure signals are not in equilibrium said differential pressure switch means is closed to activate said means for reciprocably moving said movable base until said first and second pressure signals are again in equilibrium.

2. The thermostatically responsive variable speed drive of claim 1 wherein said means for supplying a second pressure signal comprises:
   housing means defining first, second and third chambers;
   inlet means in fluid communication with said first chamber for supplying pressurized fluid thereto at a first pressure;
   outlet means in fluid communication with said second chamber for delivering pressurized fluid to said differential pressure switch means at a controlled pressure which is less than said first pressure;
   fluid pressure responsive means separating said second and third chambers;
   fluid passage means providing fluid communication between said first and second chambers;
   valve means operatively connected to said fluid pressure responsive means for movement therewith to control fluid flow in said fluid passage means;
   spring plunger means having a portion extending through said housing means from said third chamber in a sliding relationship and having movement limiting means for preventing said spring plunger means from being forced from said third chamber;

compression spring means in said third chamber engaging said fluid pressure responsive means and said spring plunger means such that, in the absence of sufficient opposing force, said valve means is biased to permit fluid communication through said fluid passage means and said movement limiting means prevents further movement of said compression spring means;

bleed means for providing restricted fluid communication between said second chamber and atmosphere;

lever means mounted for pivotal movement and normally engaging said portion of said spring plunger means extending through said housing means; and tension spring means having one end secured to said lever means and the other end to said movable base so that said tension spring means forces said lever means against said spring plunger means in opposition to said compression spring means to thereby increase the biasing force of said compression spring means in response to the position of said movable base so that said control pressure delivered to said differential pressure switch means is a function of the position of said movable base.

3. The thermostatically responsive variable speed drive of claim 2 wherein said tension spring means is adjustably secured to said lever means.

4. The thermostatically responsive variable speed drive of claim 1 wherein said means for supplying a second pressure signal comprises:

housing means defining first, second and third chambers;

inlet means in fluid communication with said first chamber for supplying pressurized fluid thereto at a first pressure;

outlet means in fluid communication with said second chamber for delivering pressurized fluid to said differential pressure switch means at a controlled pressure which is less than said first pressure;

fluid pressure responsive means separating said second and third chambers;

fluid passage means providing fluid communication between said first and second chambers;

valve means operatively connected to said fluid pressure responsive means for movement therewith to control fluid flow in said fluid passage means;

compression spring means in said third chamber engaging said fluid pressure responsive means such that, in the absence of sufficient opposing force, said valve means is biased open to permit fluid communication through said fluid passage means; and means for continuously adjusting the biasing force of said compression spring responsive to the position of said movable base.

* * * * *